United States Patent [19]

Wolfe

[11] 3,966,669

[45] June 29, 1976

[54] POWDER COATINGS HAVING A VARIEGATED, SPECKLED APPEARANCE

[75] Inventor: Norman Gilbert Wolfe, New Albany, Ind.

[73] Assignee: Celanese Coatings & Specialties Company, Louisville, Ky.

[22] Filed: Sept. 30, 1974

[21] Appl. No.: 510,339

[52] U.S. Cl............................ 260/37 EP; 260/37 N; 260/37 P; 260/39 P; 260/42.21
[51] Int. Cl.².......................................... C09D 5/29
[58] Field of Search.............. 260/37 P, 42.21, 40 P, 260/37 N, 37 PC, 39 P, 37 EP

[56] References Cited
UNITED STATES PATENTS

| | | | |
|---|---|---|---|
| 2,987,496 | 6/1961 | Simpson | 260/37 P |
| 3,041,303 | 6/1962 | Nelson | 260/42.21 |
| 3,095,400 | 6/1963 | Martino et al. | 260/42.43 |
| 3,487,041 | 12/1969 | Okuzumi | 260/40 R |
| 3,790,513 | 2/1974 | Victorius | 260/15 |

*Primary Examiner*—Lewis T. Jacobs
*Assistant Examiner*—S. M. Person
*Attorney, Agent, or Firm*—Herbert P. Price; K. A. Genoni; T. J. Morgan

[57] ABSTRACT

Powder coating compositions which produce a variegated speckled appearance after being applied and baked are made from a dry blend of a finely divided fusible polymeric film forming coating composition and an oil soluble dye. Such coating compositions are useful as decorative and protective coatings for many industrial applications.

7 Claims, No Drawings

POWDER COATINGS HAVING A VARIEGATED, SPECKLED APPEARANCE

BACKGROUND OF THE INVENTION

The field of which this invention is a part is synthetic resin coating compositions, particularly powder coating compositions.

Coatings formed from organic powders, the so-called powder coatings, are gaining acceptance in the industry. Advantages of powder coatings are the elimination of solvents and the potential 100% utilization of the powder, both of which afford a practical means to abate air pollution in paint processing.

Power coatings, as conventionally made, are generally limited to a single color composition. In the process for making powder coatings, e.g., the melt blend process, the fusible resin is melted and mixed with one or more pigments and other additives. The melt mix is then cooled and processed to a fine powder. Each particle of the powder, even though a number of pigments may have been used, will be the same color as all the other particles. When applied, heated and fused to a coating, an even color is obtained. Two powders, each of which contain different colored pigments, if intimately mixed, will produce a coating hich is substantially monocolored. If the powders are quite different in particle size and the resin components have quite different melt viscosities, then some multicolored effect will be obtained. However, with such systems, the coating itself will be inferior, due to the non-homogeniety of the film forming resins.

In U.S. Pat. No. 3,095,400, a method is proposed for making plastic compositions having a speckled appearance. According to the patent, ordinary colorants, such as pigments and dyes, are generally not suitable for producing speckled effects. Most colorants are supplied in the form of finely ground powders with particle sizes of about 365 mesh or smaller. Particles below about 200 mesh in size are not readily discernible as discrete particles but rather tend to alter the color of the material in which they are incorporated. The use of ordinary colored particles of a size greater than 200 mesh results in the disintegration of the particle during processing of the base material. This causes undesirable effects such as uncontrollable smearing and discoloration of the base material by the disintegrated particle. These difficulties are overcome by incorporating a colored thermosetting resin in with a thermoplastic resin to obtain the colored effect. As described by the patent, the particle size of the pigmented thermoset resin is quite large, being larger than 200 mesh and preferably larger than 80 mesh but smaller than 10 mesh. Sucn compositions are useful in molding compounds, but are too large to be used successfully in powder coatings.

In U.S. Pat. No. 3,049,761, multicolored sheet material is made by blending granulated resin of various colors with a plastisol paste. The mixture is then formed into a layer or sheet, fused and pressed.

In U.S. Pat. Nos. 2,837,437, 3,415,673, 3,487,041, 3,536,658 and 3,663,493, the use of pigments and dyes with various polymers to produce even colored compositions is described. U.S. Pat. Nos. 2,097,233 and 3,108,893 describe methods for applying coatings in patterns using electrostatic techniques.

In U.S. Pat. No. 3,725,089, a method for making multicolored coatings using aqueous dispersions is described.

SUMMARY OF THE INVENTION

This invention pertains to powder coating composition. In one aspect this invention relates to powder coating compositions which produce variegated speckled coatings. In another aspect the invention pertains to a method for producing variegated, speckled powder coatings.

By this invention powder coating compositions capable of producing a speckled coating after being baked are made from a physical blend of a finely divided, fusible polymeric, film forming coating composition and an oil soluble dye wherein the dye is present in the amount of about 0.03 to about 0.3 weight percent based on the weight of the coating composition. When the powder coating composition is applied to the substrate to be coated, preferably by electrostatic spraying techniques, the dye is hardly visible. However, after the coating is heated and fused, the color of the dye develops. Colored specks of various shapes and sizes become visible in the coating surface.

DESCRIPTION OF THE INVENTION

As used in this invention the terms "pigments" and "dyes" are distinguishable and are not to be used interchangeably. According to the *Condensed Chemical Dictionary*, Seventh Edition, Reinhold Publishing Corporation, New York (1966), "pigments" is defined as a general term used for the various inorganic and organic, natural and synthetic chemical substances and mixtures that are used to confer color in manufacturing paints, printing inks, etc. A pigment is always a finely divided solid powder, insoluble but wettable under the circumstances of use. The distinction between pigments and dyes is not sharp, but pigments are almost without exception insoluble, while dyes are almost always organic substances for use in coloring textiles or other fibrous and plastic substances.

According to *Encyclopedia of Chemical Technology*, Second Edition, by Kirk-Othmer, John Wiley & Sons, Inc., New York (1965), Volume 7, page 462, dyes are defined as intensely colored substances which, when applied to a substrate, impart color to this substrate by a process which, at least temporarily, destroys any crystal structure of the colored substance. The dyes are retained in the substrate by adsorption, solution, and mechanical retention, or by ionic or covalent chemical bonds. Pigments, on the other hand, are usually applied in vehicles and retain, to some degree, their crystal or particulate structure.

Dyes useful in this invention fall into the class of oil soluble dyes, i.e., dyes which have some degree of solubility in organic solvents. *Colour Index*, Third Edition, published by The Society of Dyes & Colourists (1971) describes dyes in detail. Pertinent parts of this publication as set forth hereinafter are hereby incorporated by reference. Solvent Dyes, which are useful in this invention are described in *Colour Index, Vol. 3*, pages 3563–3648. Disperse Dyes, which are described in Volume 2, pages 2479–2742, Fluorescent Brighteners, Volume 2, pages 2743–2772 and Food Dyes, Volume 2, pages 2773–2788, those of which have some degree of solubility in organic solvents, are also useful in this invention. Such dyes include those which fall in the chemical class of monoazo, disazo, azo, trisazo, disazo amine complexes, azo metal complexes, azomethine, quinoline, ketone imine, acid/basic dyestuff complex, nitro-diphenylamine, nitro, amino ketone, fluorone, benzimidazone, xanthene, anthroquinone, acridine, perinone, thioxanthene, triaryl methane, thiazine azine, anthroquinone (1,4-dialkyl-amino derivative), anthraquinone (amino-hydroxyderivative), indophenol, phthalocyanine, indonaphthol, stilbene, polyazine, naphthalimide, coumarin, trimethyldihydropyridine, carotenoid, and the like.

Dyes useful in this invention can be classed as those which have some degree of solubility (1% to 100%) in organic solvents, and which have melting points from about 70°C. to about 250°C. Useful dyes have particle sizes from about 0.01 to about 50 microns, preferably 0.1 to about 5 microns.

The finely divided fusible polymeric film forming compositions useful in this invention are any of the fusible film forming compositions that have been and can be used in making powder coatings. The compositions can be thermoplastic or thermosetting. Useful thermoplastic compositions are nylons, polyesters, polyethylene, polypropylene, acrylic resins, e.g., polymethyl methacrylate, phenoxy resins, polycarbonates, polyacetals and the like. Such compositions can be finely divided by well known means, and will melt or fuse at a temperature of 75°C. to 200°C.

Useful thermosetting compositions are polyepoxide resins, thermosetting acrylic resins, thermosetting polyesters, phenolic resins, and amino resins. Such compositions are capable of being finely divided, will melt or fuse at a temperature of 50°C. to 200°C. and will cure to a thermoset state when heated above 50°C. Examples of compositions useful in powder coatings can be found in U.S. Pat. Nos. 3,753,958, 3,790,513, 3,624,232, 3,759,854, 3,758,633, 3,676,405 and 3,647,726, which are hereby incorporated by reference.

The finely divided fusible polymeric film forming compositions can be used without pigments or other additives. However, it is preferred that the compositions contain pigments, preferably pigments which have a different color, shade or hue from the dyes which are added. Examples of pigments include titanium dioxide, phthalocyanine blue, phthalocyanine green, cadmium sulfide, chromic oxide, zinc oxide, calcined iron oxide, aluminum powder and the like. The amount of pigment used will vary depending upon the effect that is desired in the coating, but, generally, it will vary from about trace amounts up to about 60 parts by weight per 100 parts by weight of the polymeric film forming coating composition.

In addition to pigments, the coating composition can also contain fillers, thixotropic agents, flow control agents, etc. which are used to impart specific, desired properties to the coating compositions. Suitable fillers are mica, bentonites, clays, synthetic polymers and resins, rubbers, alumina, short-fiber asbestos, wood flour, silica, talc, and the like. Such fillers have particle sizes from about 0.1 micron upward. The quantity of fillers used is dependent upon many factors, such as cost, particle size, absorption characteristics, loading volume and the effect desired in the coating itself. Generally, the amount of filler will vary from about 0 to about 60 parts by weight per 100 parts by weight of polymeric film forming coating composition.

Sometimes a thixotropic agent is used to prevent dripping or sagging at high film build. Any of the thixotropic agents normally used in the art are suitable for use in the present composition, including silica aerogels, bentonite clays and their derivatives, castor oil derivatives and the like.

Flow control agents, as described in U.S. Pat. No. 3,730,930, can be added to improve the flow and leveling of the powder during the heating and fusing of the applied coating. Examples of suitable flow control agents are low molecular weight acrylic ester polymers having a glass transition temperature below that of the film forming compositions used in this invention. Such acrylic ester polymers include polylauryl acrylate, poly(2-ethyl hexyl acrylate) and polybutyl acrylate. Flow control agents are used in the amounts of about 0.1 to about 1 part by weight based on the weight of the film forming composition.

The finely divided polymeric film forming coating composition is prepared by the fusion process or various wet methods. In the fusion process a blend of the components which are used to form the coating composition are melted in a mill and worked with great intensity, which gives a good dispersion of the pigments and a homogeneous product. This is accomplished by the use of a two-roll mill, an extruder, a masticator, or an intensive mixer. In this procedure, the coating ingredients are intimately mixed and fed into one of the above pieces of equipment having appropriate heat to convert the mixture to a molten mass. After being removed from the mixing equipment, the milled product is solidified by cooling with air or water quenching and is converted into a powder.

The wet method processes for converting the coating components into a powder coating include spray drying, belt drying, thin film evaporation, devolatilizing, precipitation and freeze-drying. In the spray drying process, a fine powder of well-shaped particles and good distribution in size are formed. No further size reduction is needed when the spray drying process is used.

Coating compositions are reduced to powders by grinding and pulverizing using attrition, compression, shearing and impact. Types of mills used include attrition mills, compression and hammer mills, shear and blade mills, impact, micronizer and fluid energy type mills, ball mills, centrifugal impact mills, colloid mills and pinned disc mills. The particle size of the powder coatings will vary from about 10 microns to about 100 microns with the preferred range being about 20 to about 75 microns.

In carrying out the process of this invention, the finely divided fusible polymeric film forming composition is dry blended with the oil soluble dye until an intimate uniform mixture is obtained. The dye is used in the amount of about 0.03 to about 0.3 weight percent based on the weight of the film forming composition.

The coating compositions of this invention can be applied to the substrate to be coated by any of the well known techniques, e.g., rolling the object to be coated in the powder, flock coating, fluidized bed, flame spraying, electrostatic fluidized bed, electrostatic powder spray, and electrostatic cloud chamber. A preferred method is the electrostatic powder spray method. The coatings are applied to a thickness of about 0.5 to about 10 mils, preferably about 1 to about 3 mils. The coatings are heated at a temperature high enough and long enough to fuse the coatings to an even coat and to cure them if a thermoset resin is used.

Generally, this temperature will vary from about 120°C. to about 300°C. for a period of 1 minute to about 1 hour.

The coatings of this invention can be used as decorative and protective coatings for office furniture, lawn furniture, air conditioner housings, lawn mower bodies, and various industrial finishes.

The following examples describe the invention in more specific detail. However, the invention is not to be constructed as being limited thereto. All parts and percentages, unless specified differently, are parts and percentages by weight.

EXAMPLE 1

100 Parts of a glycidyl ether of bisphenol A having an epoxide equivalent weight of 950 and a melting point of 100°C. were added to a Baker-Perkins steam heated mill along with 0.5 part of a flow control agent and 50 parts of titanium dioxide. The mill contents were heated to 93°–116°C. and milling was begun to melt the glycidyl ether and to intimately mix it and the pigment. After thorough mixing and blending, the heat was lowered to about 88°C. and 4 parts of dicyandiamide were added. Milling was continued for about 5 minutes. The pigmented resin was then removed and cooled. After cooling, the resin was crushed to about 18 mesh size in a hammer mill and was then ball milled overnight to a mesh size of 200–230 (U.S. Standard Sieve).

About 0.1 percent, based on the weight of the powdered pigmented resin, of Oil Red dye (du Pont) was added to a portion of the powdered pigmented resin. The components were then shaken on a paint shaker for 3 minutes to thoroughly disperse the dye in the powdered resin. The resulting powder was then used to coat steel panels to a coating thickness of 1 to 2 mils using electrostatic spraying techniques. The coated panels were white. After baking for 10 minutes at 204°C., the well cured panels had an attractive red speckled appearance on a white background.

A speckled coating was also obtained when Alizarine Irisol (G.A.F.) was substituted for the Oil Red dye in the above formula.

EXAMPLE 2

Using the same procedure as was described in Example 1, a white epoxy powder coating was prepared from 56.6 parts of the glycidyl ether described in Example 1, 38.7 parts of titanium dioxide pigment, 0.2 part finely divided fumed silica, 1 part of flow control agent, 0.5 part of flow control aid and 3 parts of dicyandiamide.

To separate portions of the powder were added about 0.1 percent, based on the weight of the powder, of Oil Blue A dye (du Pont), Oil Yellow dye (du Pont) and Sudan Corinth dye (G.A.F.). Each portion was shaken on a paint shaker for about 3 minutes to thoroughly disperse the dye in the powder. The powders were then applied as coatings by electrostatic spray to steel panels. After baking for 10 minutes at 204°C., the well cured coatings had an attractive speckled appearance on a white background.

When the dyes were replaced with pigments, e.g., Monastral Violet, Monastral Red and Monastral Blue, no speckled coatings were obtained. The coatings appeared white with the added color from the pigments being hardly visible.

EXAMPLE 3

To 100 parts of the white epoxy powder described in Example 2 were added 0.0299 part of Anthraquinone Green dye (du Pont). After mixing for 3 minutes on a paint shaker, the resulting powder was electrostatically sprayed onto steel panels to a thickness of 1 to 2 mils. After baking for 10 minutes at 204°C., well cured coatings having a light green speckled appearance on a white background were obtained.

The above procedure was repeated except 0.1619 part of the dye was used with 100 parts of the powder. After baking, a speckled coating was obtained in which the green color was much more intense.

EXAMPLE 4

100 Parts of a polyester resin (the reaction product of 6 mols of isophthalic acid, 4 mols of trimethylol ethane and 3 mols of neopentyl glycol having a melting point of 118°C.) were blended with 60 parts of titanium dioxide, 26 parts of hexamethoxymethyl melamine, 10 parts of a glycidyl ether of bisphenol A having an epoxide equivalent weight of 950 and a melting point of 100°C., and 0.5 part of a flow control aid using the procedure described in Example 1. Powders were prepared using the procedure described in Example 1.

About 0.1 percent Alizarine Irosol N dye (G.A.F.) was mixed with a portion of the pigmented polyester powder. The powder was applied as a coating to metal panels by electrostatic spray techniques. After heating for 20 minutes at 204°C., well cured panels having a speckled appearance were obtained.

To 25 parts of the pigmented polyester powder were added 0.0695 part of Latyl Cerise B dye (du Pont). After mixing for 5 minutes on a paint shaker, the powder was applied to steel panels by electrostatic spray to a thickness of 1 to 2 mils. The panels were heated for 30 minutes at 177°C. Well cured speckled coatings were obtained.

Speckled coatings were also obtained from 25 parts of the pigmented polyester powder and 0.0705 part of Oil Blue dye (du Pont).

A variegated speckled coating was obtained from 25 parts of the pigmented polyester powder and 0.0358 part of Anthraquinone blue (du Pont), 0.0412 part Anthraquinone Green (du Pont), 0.0196 part Oil Red (du Pont) and 0.0222 part sudan Black (G.A.F.).

EXAMPLE 5

100 parts of an acrylic resin made by polymerizing 39.2 parts styrene, 49.8 parts butyl methacrylate and 11 parts methacrylic acid, having a melting point of 111°C. and an acid value of 58 were blended with 62 parts of glycidyl ether of bisphenol A having an epoxide equivalent weight of 600 and a melting point of 85°C., 71 parts of rutile titanium dioxide and 0.1 part of cobalt acetate. A coating powder was prepared using the procedure described in Example 1.

About 0.1 percent, based on the weight of the acrylic-epoxy powder, of Alizarine Irisol N (G.A.F.) was blended with the powder by mixing for 5 minutes on a paint shaker. Coatings on steel panels were obtained by the electrostatic spray application of the powders. After baking for 10 minutes at 204°C., well cured speckled coatings were obtained.

It is understood that the foregoing detailed description is given merely by way of illustration and that many variations can be made therein without departing from the spirit of this invention.

What is claimed is:

1. a powder coating composition capable of producing a speckled coating after being baked which comprises a physical blend of a finely divided fusible polymeric film forming coating composition and an oil soluble dye wherein the dye is present in the amount of about 0.03 weight percent to about 0.3 weight percent based on the weight of the polymeric film forming coating composition and wherein the dye has a particle size of about 0.01 to about 50 microns.

2. The composition of claim 1 wherein the finely divided fusible polymeric film forming coating composition has a particle size of about 10 microns to about 100 microns.

3. The composition of claim 2 wherein the oil soluble dye has a particle size of about 0.1 to about 5 microns.

4. The composition of claim 1 wherein the finely divided fusible polymeric film forming coating composition contains pigments intimately mixed therein.

5. The composition of claim 4 wherein the pigments and dye are of contrasting colors.

6. The composition of claim 1 wherein the polymeric film forming composition is thermoplastic.

7. The composition of claim 1 wherein the polymeric film forming composition is thermosetting.

* * * * *